United States Patent [19]
Teti

[11] 3,834,563
[45] Sept. 10, 1974

[54] BATTERY CARRIER
[75] Inventor: John J. Teti, Bluefield, W. Va.
[73] Assignee: A-T-O Inc., Willoughby, Ohio
[22] Filed: Oct. 10, 1972
[21] Appl. No.: 296,261

[52] U.S. Cl.................. 214/77 R, 180/68.5, 104/34
[51] Int. Cl.............................................. B60p 1/48
[58] Field of Search......... 214/77 R, 77 P, DIG. 10, 214/80, 450, 130 R, 83.24; 104/34; 105/51; 180/68.5

[56] References Cited
UNITED STATES PATENTS

| | | | |
|---|---|---|---|
| 1,529,032 | 3/1925 | Meisner et al. | 180/68.5 X |
| 2,607,433 | 8/1952 | Simi | 180/68.5 |
| 3,200,975 | 8/1965 | Chase | 214/77 R X |
| 3,284,153 | 11/1966 | Goodacre | 180/68.5 X |
| 3,325,118 | 6/1967 | Hall | 214/77 R X |
| 3,737,055 | 6/1973 | Pettit | 214/130 R X |

*Primary Examiner*—Albert J. Makay
*Attorney, Agent, or Firm*—Webster B. Harpman

[57] ABSTRACT

A battery carrier for moving the batteries of mine tractors and the like into and out of a receiving compartment therefor includes pivoted arms having their free ends supporting the battery and power means for moving the arms and the battery carried thereby in an arcuate path with a minimum of vertical travel.

4 Claims, 5 Drawing Figures

BATTERY CARRIER

BACKGROUND OF THE INVENTION

1. Field of the Invention:

This invention relates to battery carriers sometimes called transfer mechanisms for moving batteries sidewardly out of battery compartments in vechicles.

2. Description of the Prior Art:

Prior structures of this type have employed battery carrier frame supported on the ends of pivoted arms and movable manually as in U.S. Pat. No. 2,607,433 and pantographic linkage movably supporting a battery tray as in U.S. Pat. No. 2,802,540. Still other proposals are found in U.S. Pat. No. 3,336,997 and U.S. Pat. No. 1,678,033.

This invention provides for lifting the batteries a minimum vertical amount and moves them in a substantially greater transverse motion than the devices of the prior art and provides an easier, quicker means of changing the batteries in mine cars and the like as necessary for recharging, etc.

SUMMARY OF THE INVENTION

A battery carrier having spaced pivoted arm assemblies and means on the free ends of the arms for supporting a battery and extensible power means for moving the pivoted arms upwardly and outwardly with respect to a battery compartment whereby a battery carried by the carrier is lifted a small distance vertically and moved a relatively longer distance sidewardly.

DESCRIPTION OF THE PREFERRED EMBODIMENT

Figure 1:
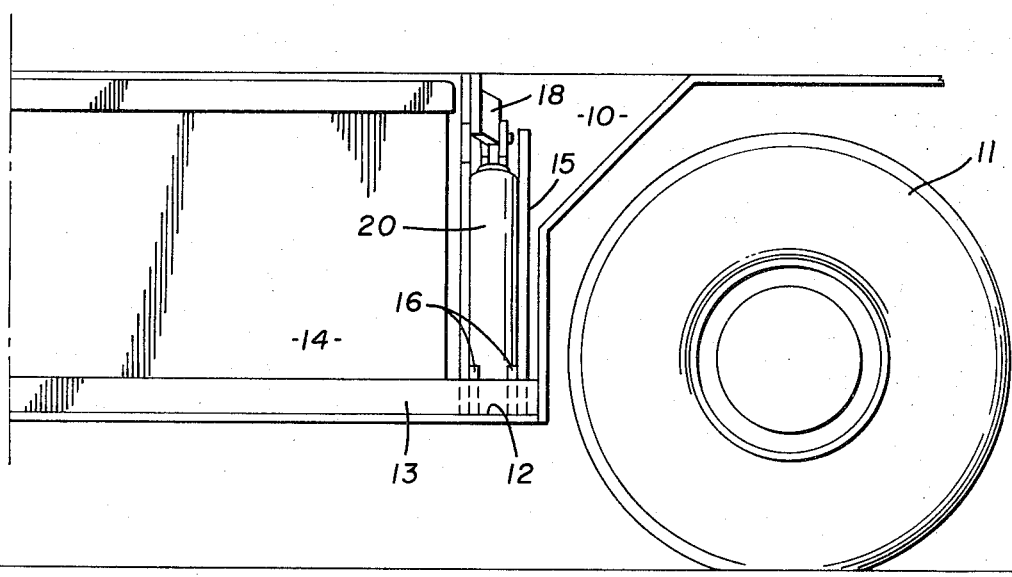
FIG. 1 is a front elevation of a portion of a mine car showing a battery compartment and a battery positioned therein and one part of a carrier in retracted position.
Figure 2:
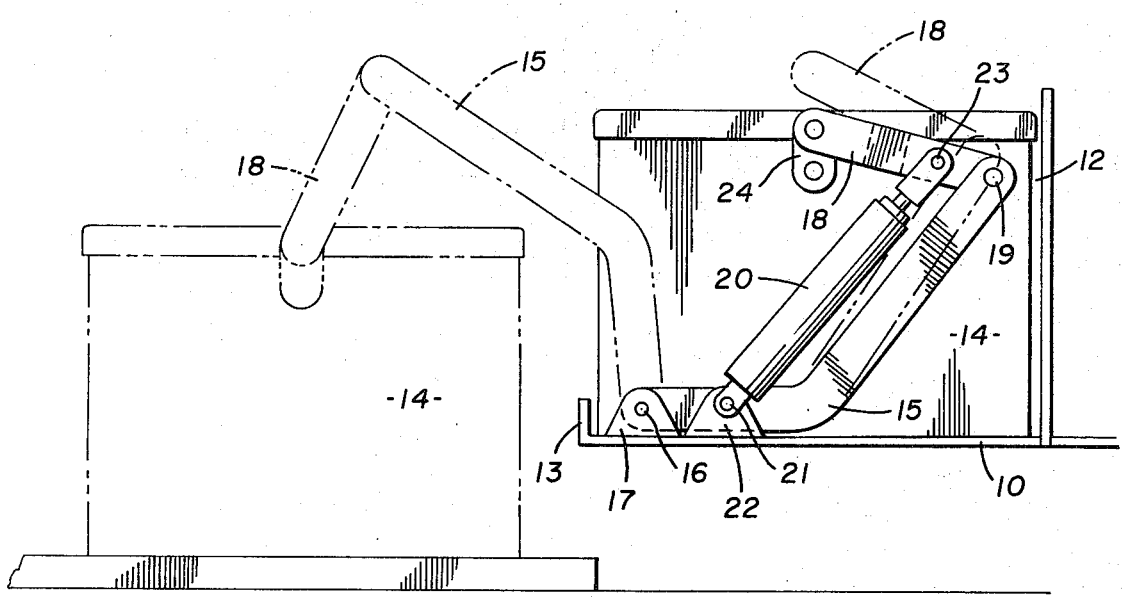
FIG. 2 is a side elevation of the battery carrier seen in FIG. 1 with parts in broken lines illustrating the alternate position of the carrier and battery.

In its simplest form the battery carrier of the present invention is illustrated in FIGS. 1 and 2 of the drawings and by referring to FIG. 1 it will be seen that a side view of a portion of a mine car 10 having ground engaging wheels 11 is illustrated and particularly that part of the mine car comprising a battery compartment 12. A threshold bar 13 is positioned across the outer edge of the battery compartment 12 so as to retain a battery 14 in position in the battery compartment 12. Means for lifting the battery 14 so that it can be moved outwardly as seen in FIG. 1 of the drawings and over the threshold bar 13, comprise a pair of pivoted arm assemblies 15 pivoted at 16 to brackets 17 in the battery compartment 12 of the mine car 10. The pivoted arm assemblies 15 include arm extensions 18 pivoted at 19 to the upper free ends of the arms 15 by a pivot joint which permits only limited movement between the members 15 and 18.

By referring to FIG. 2 of the drawings, broken lines will be seen to indicate the degree of motion possible between the members 15 and 18 and those skilled in the art will recognize that the pivot joint 19 limiting the motion between these members may comprise slotted discs in which raised bars are loosely positioned with the slotted discs being positioned on the arms 15 and the raised bars positioned on the arm extensions 18.

Still referring to FIGS. 1 and 2 of the drawings, it will be seen that the solid line representations of the battery 14 show it positioned in the battery compartment 12 with the pivoted arm assemblies 15 and their arm extensions 18 in retracted position. Hydraulic piston and cylinder assemblies 20 are pivoted at 21 to brackets 22 secured to the mine car 10. The piston rods are pivoted at 23 to the arm extensions 18 and suitable connection means, not shown, is provided to supply the hydraulic piston and cylinder assemblies 20 with suitable fluid pressure for actuation as will occur to those skilled in the art.

The outermost ends of the arm extensions 18 have links 24 pivoted thereto which in turn are engaged on the battery 14 on the medial line thereof and it will thus be seen that when fluid pressure is directed into the hydraulic piston and cylinder assemblies 20, the arm extensions 18 will move upwardly to the positions shown in broken lines as permitted by the limited motion pivots 19 lifting the battery 14 sufficiently to clear the threshold bar 13.

It will be seen that due to the difference in the locations of the pivots 16 and 21 the net result of the energization of the hydraulic piston and cylinders 20 will be to swing the pivot arm assemblies 15 from right to left as seen in FIG. 2 of the drawings in broken lines and that in doing so the battery 14 will initially be elevated so as to clear the threshold bar 13 and then swung outwardly and downwardly with respect to the battery compartment 12.

In a mine car operation the battery is removed to a charging station and a newly charged battery picked up and replaced in the battery compartment 12 and the device of the invention will operate in either direction upon reversing the fluid pressure supplied the hydraulic piston and cylinder 20.

Figure 3:
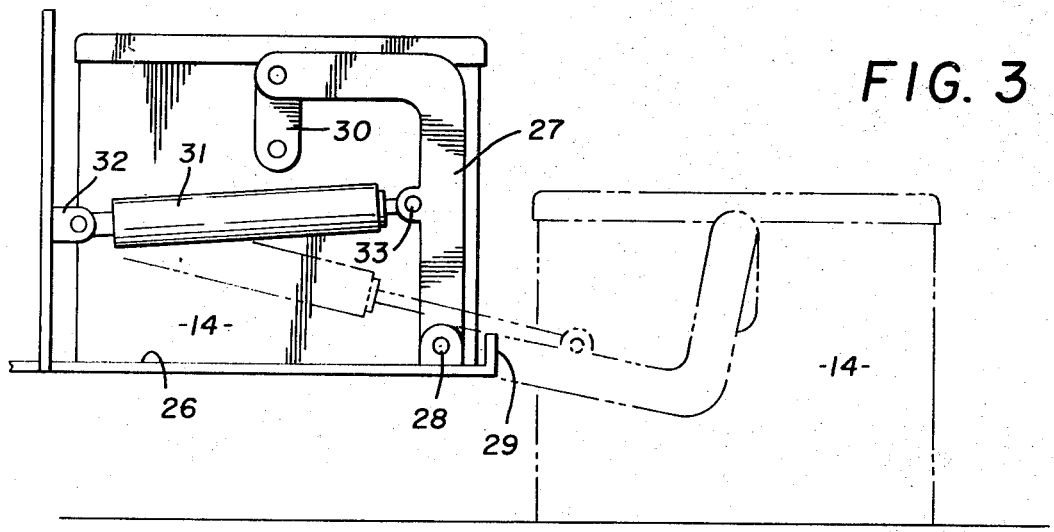
FIG. 3 is a side elevation of a modification of the battery carrier with parts in broken lines showing the device and the battery in position away from the normal location.

Those skilled in the art will be aware that modifications in the arrangement of the pivoted arms 15 can and will be made and by referring to FIG. 3 of the drawings, one such modification may be seen. In FIG. 3, a battery 14 is positioned in a battery compartment 26 in a mine car or the like with a pair of pivoted arm assemblies 27 pivoted thereto as at 28 and adjacent a threshold bar 29. The pivoted arm assemblies 27 are inverted L-shaped with a vertical and a horizontal section and links 30 are pivoted to the outer ends of the horizontal sections and secured to the battery 14 on the opposite sides thereof on the medial line thereof.

Piston and cylinder assemblies 31 are positioned between and pivoted to brackets 32 on the mine car and pivots 33 on the pivoted arm assemblies 27 and when energized will move the pivoted arm assemblies 27 and the battery 14 from the position shown in solid lines in FIG. 3 of the drawings to the position shown in broken lines. Reversal of the fluid pressure supplied the piston and cylinders assemblies 31 will retract the battery carrier of FIG. 3 and move the battery 14 back into the battery compartment 26.

Figure 4:
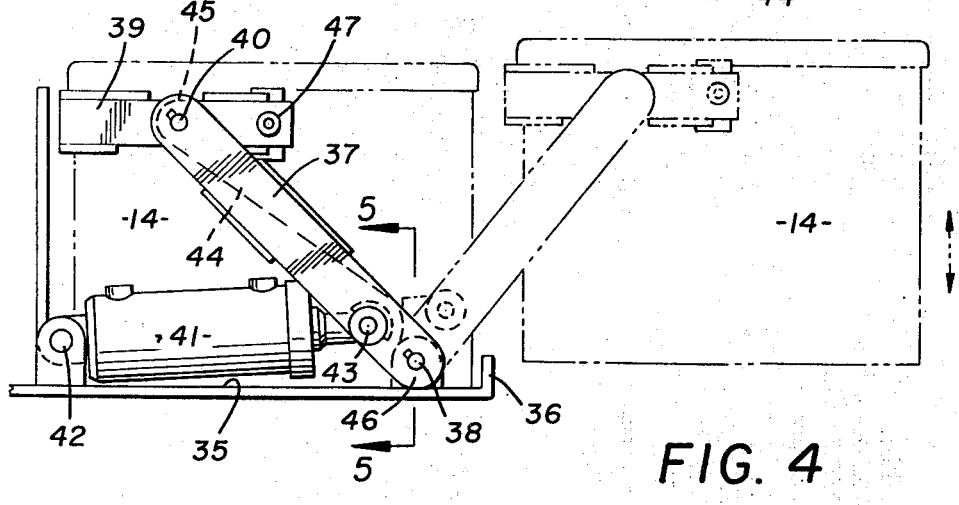
FIG. 4 is a side elevation of a further modification of the invention with parts in broken lines showing the position of the carrier and battery when the same is moved from its usual position.

Still another modification of the invention may be seen in FIG. 4 of the drawings and by referring thereto it will be seen that a battery compartment 35 having a threshold bar 36 normally positions a battery 14 in a vehicle such as a mine car and a pair of upstanding support arms 37 are pivoted at 38 to the compartment 35. The upstanding support arms 37 have horizontally positioned booms 39 pivoted to their uppermost free ends as at 40 and so arranged as to be maintained in their horizontal position during the arcuate movement of the upper ends of the support arms 37 as occasioned by hydraulic piston and cylinder assemblies 41 which are pivoted to the compartment 35 at 42 and to the support arms 37 at 43. In order to maintain the booms 39 on horizontal planes, at least one flexible tension member in the form of a flat link chain 44 is attached at its upper end at 45 to the boom 39 at one side of the pivot 40. The flat link chain 44 then extends over the pivot 40 and then downwardly and over the opposite side of the pivot 43 and in under the pivot 38 where its opposite end is secured at 46 to the compartment 35.

It will therefore be observed that when the hydraulic piston and cylinder assembly 41 is energized to move the pivoted arm assembly 37 from the position shown in solid lines in FIG. 4 to the position shown in broken lines, the movement of the pivot 43 against the flat link chain 44 will wrap it partially around the pivot 38 so as to shorten its effective length and cause the end 45 thereof attached to the booms 39 to maintain the booms 39 in horizontal position at all times during the movement of the pivoted arm assemblies 37. Pulleys are located on the pivots 38 and 40 and on the right ends of the booms 39 on the pivots 47. Separate cables, not shown, may be trained over these pulleys and attached to the battery to suspend the same from the booms 39.

The booms 39 are maintained in horizontal position by the action of the flexible tension members 44 which are attached at their upper ends to the booms 39 on one side of the pivots 40 and then extend over the pivots 40 and then downwardly toward the pivots 38 passing over the pivots 43 by which the piston and cylinder assemblies 41 are attached to the support arms 37. The lower ends of the flexible tension members 44 are then secured to the compartment 35 at point 46 thereon which is beside and below the pivots 38. As the support arms 37 move from left to right as seen in FIG. 4 of the drawings in broken lines, the lower ends of the flexible tension members 44 are partially wrapped around the pivot supports 38 by the engagement of the pivotal attachments 43 thus effectively shortening the lower ends of the flexible tensioning members 44 and causing their upper ends which are attached to the booms 39 to move upwardly as the support arms 37 move outwardly of the battery compartment 35. The reverse action takes place when the support arms 37 move to the left and into the compartment 35 thus maintaining the booms 39 in horizontal position at all times.

Figure 5:
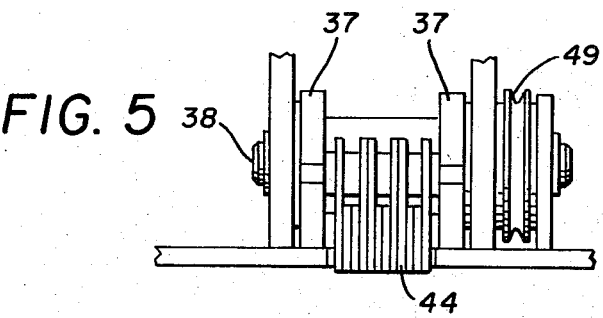
FIG. 5 is an enlarged detail on line 5—5 of FIG. 4.

In FIG. 5 of the drawings an enlarged sectional detail on line 5—5 of FIG. 4 will be seen to illustrate the pivot 38 with the pivoted arm assembly members 37 pivoted thereto and the attached end portion of the flat link chain 44. The cables heretofore referred to for suspending the battery are used for imparting vertical motion to the battery relative to the booms 39.

By referring again to FIG. 4 of the drawings, it will be seen that actuation of the hydraulic piston and cylinder 41 will pick up and move the battery 14 from the battery compartment 35 to a position outwardly of the same whereupon the cable trained over the pulley 47 on the boom 39 can be moved to raise or lower the battery as desired.

From the foregoing it will be seen that a battery carrier has been illustrated and described with two modifications thereof which will lift a heavy battery a short distance vertically and then move the same horizontally out of a battery compartment to a location where it may be deposited and/or exchanged. The actuation of the battery carrier is simple, there are few moving parts and a power source is conveniently found in many mine tractors.

Although but three embodiments of the present invention have been illustrated and described it will be apparent to those skilled in the art that various changes and modifications may be made therein without departing from the spirit of the invention.

I claim:

1. A battery carrier for a vehicle having a battery compartment therein, said carrier arranged to support and move a battery into and out of said compartment, said carrier consisting of a pair of upstanding support arms pivotally supported in said compartment at their lower ends, horizontally positioned booms pivotally attached to said upper ends of said support arms and means pivotally connected to said support arms inwardly of their ends for imparting arcuate motion thereto and arranged to move the upper ends of the arms and the booms thereon from a first position in said compartment to a second position outwardly of said compartment, suspension means on said booms for supporting said battery and means on said support arms for maintaining said booms in horizontal position and consisting of a pair of flexible tension members, each attached at one end to one of said booms and at its other end to said compartment and each engaged around one of said pivotal attachments at the upper ends of the support arms and around one of the pivotal supports at the lower ends of said support arms and in the path of the means pivotally connected to said support arms for moving the same so that pivoting of the support arms partially wraps and unwraps said flexible tension members around said pivotal attachments and pivotal supports and moves said flexible tension members at both ends thereof to control the horizontal position of said booms.

2. The battery carrier set forth in claim 1 and wherein the means pivotally connected to said support arms inwardly of their ends for moving the same are connected to said arms adjacent said pivotal supports of said arms in said compartment.

3. The battery carrier set forth in claim 1 and wherein said means pivotally connected to said support arms inwardly of their ends consists of piston and cylinder assemblies in said compartment and wherein said means connected to the support arms is offset with respect to the pivotal attachments and pivotal supports on said arms and wherein said flexible tension members are engaged over said offset means in oppositely disposed relation to their engagement over said pivotal attachments and pivotal supports.

4. The battery carrier set forth in claim 1 and wherein said suspension means on said booms for supporting said battery are located at one of the ends thereof so that weight of said battery keeps said flexible tension members in tension.

* * * * *